Aug. 13, 1929.  C. H. RIEGEL  1,724,367
SHIPPING CONTAINER
Filed March 13, 1926
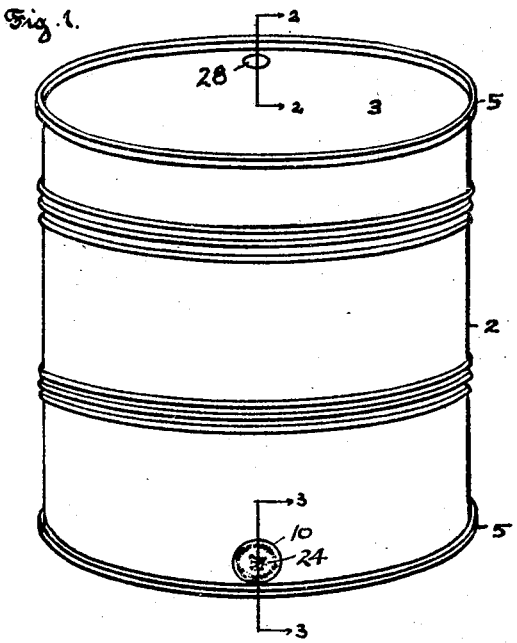
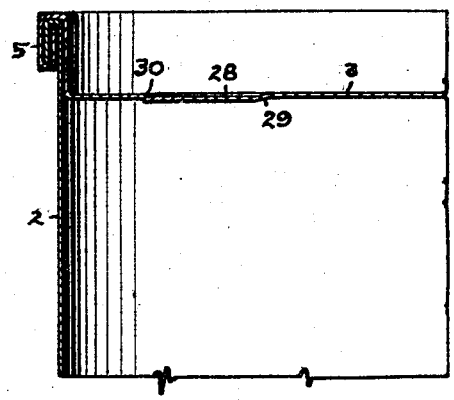
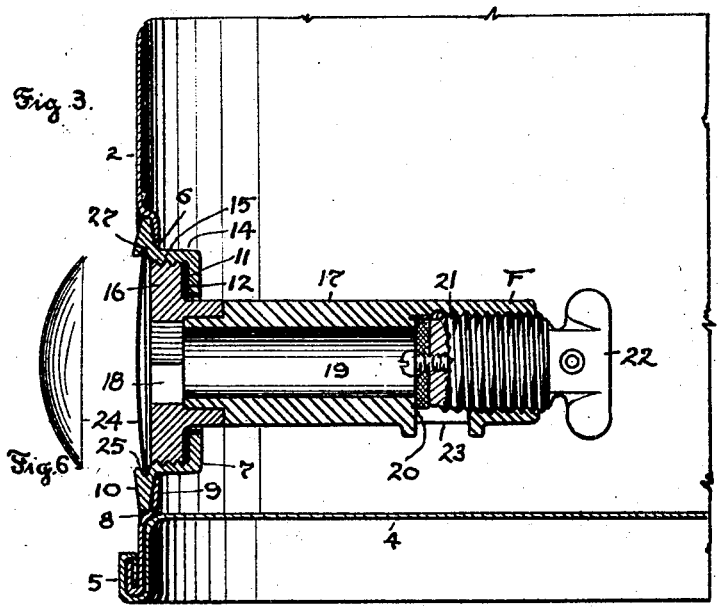
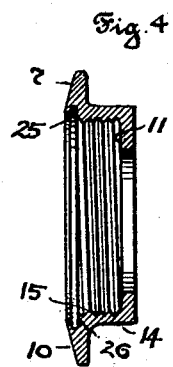
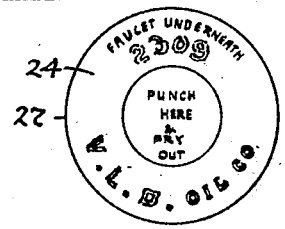
Inventor
C. H. RIEGEL
Attorney Patented Aug. 13, 1929.

1,724,367

UNITED STATES PATENT OFFICE.

CLARENCE H. RIEGEL, OF CHAGRIN FALLS, OHIO.

SHIPPING CONTAINER.

Application filed March 13, 1926. Serial No. 94,417.

My invention relates to an improvement in shipping containers, and my object in general is to provide a container which may be sealed by the shipper in an inexpensive and facile way, and in which container a faucet may be inserted and concealed behind the sealing device so that it may be used by the consignee or ultimate purchaser for withdrawing the liquid from the container. The conception involves the use of a specially designed bung ring or coupling member, a reversible faucet adapted to be used both as a closure for the bung ring and as a discharge spout, and a sealing disk adapted to be secured to the ring to cover and conceal the faucet, whereby the faucet cannot be removed when used as a closure member without first destroying the sealing disk. The head of the container is also constructed in a particular way to permit a vent opening to be obtained in a very simple and expeditious way, all as hereinafter shown and described and more particularly pointed out in the claims.

In the accompanying drawing, Fig. 1 is a perspective view of a metallic shipping container embodying my invention, and Fig. 2 is a sectional view on a larger scale of a portion of the head of the container having a partly developed vent opening. Fig. 3 is a sectional view of a faucet sealed within the container. Fig. 4 is a sectional view of the bung ring alone. Fig. 5 is a front view of the sealing disk alone, and Fig. 6 a sectional view of the disk as it appears before it is introduced into the holding channel of the bung ring.

The container or receptacle may be variously constructed, but as shown, it comprises a cylindrical sheet metal body 2 and sheet metal heads 3 and 4 affixed to the opposite ends of the body by double seams 5. A flanged depression and opening 6 is formed in the side wall of body 2, preferably near one end, in which a flanged coupling member or bung ring 7 is permanently fastened by solder applied at joint 8, or by welding wall flange 9 and ring flange 10 together. Member 7 is of ring shape but dished or recessed and formed with an inwardly-extending base flange which provides a flat seat 11 for a sealing washer 12 of compressible material, and the side wall 14 of the recess is provided with screw-threads 15 to permit the screw-threaded flange or head 16 of a cylindrical faucet F to be screw-connected therewith, either when the cylindrical body 17 of the faucet is introduced into the container where it is concealed, or when said body is reversed end for end and extends outwardly from ring member 7 where it is exposed wholly to view.

An angular wrench socket 18 extends through head 16 of the present faucet into open communication with one end of an axial fluid passage 19 in body 17, and the opposite end of this passage opens into a valve seat 20 at the base of a valve chamber which is screw-threaded to receive a screw-threaded valve member 21 having a handle 22 exposed at the end of body 17. A lateral opening 23 in one side of faucet body 17 serves as a discharge port or spout when the faucet projects outwardly from bung ring 7, but when faucet body 17 projects inwardly into the container valve 21 is tightly seated and no liquid can pass into passage 19 from port 23. Nor can the valve be opened readily when faucet body 17 extends into the container because handle 22 is then inside of the container and not accessible. To make the handle accessible the faucet must be disconnected bodily from ring 7, and withdrawn. To prevent such removal by unauthorized persons without leaving visible evidence of the attempt, a sealing disk 24 of thin flexible metal is pressed into the mouth of flanged ring 7 in front of head 16 which is of less thickness than the depth of the screw-threaded recess in the ring. Thus when head 16 is tightly seated upon sealing washer 12 the outer face of the head is retired slightly in respect to an annular groove or channel 25 and shoulder 26 formed in the side of the enlarged mouth of ring 7 opposite flange 10. Shoulder 26 provides an abutment or seat against which the circular edge 27 of disk 24 may be pressed when this disk is first inserted into the enlarged mouth of ring 7, and annular groove 25 provides a space for edge 27 to enter when the disk is flattened more or less and its diameter thereby increased by the application of pressure to its convex side. Sealing disk 24 is concavo-convex and of substantially the same diameter as the enlarged mouth of ring 7 so that it may fit snugly therein when first entered, and groove 25 is of V-shape to effect a wedging fit of edge 27 when the disk is flattened and spreads into the groove. When the disk is flattened or substantially flattened, it lies in the same plane as flange 10 and may bear against the outer flat face of head 16 of the faucet. In this way the faucet is locked within the ring and entirely hidden from view, and a fluid-tight joint is obtained at the mouth of the ring in addition to the sealed joint at washer 12. The disk also covers and seals the end opening of the fluid passage in the faucet, thereby supplementing the closure effected by valve member 21. The disk can not be removed from the ring without destroying or marring it, but authorized persons may readily remove the faucet by pressing an angular wrench or tool against the center of the disk directly opposite the angular socket or opening 18 in the faucet, and the disk being thin the tool will readily penetrate it and enter socket 18, thereby permitting the faucet to be unscrewed and withdrawn from the ring. When this is done the container is laid on its side with the bung ring uppermost so that the contents of the container can not escape. The faucet is then reversed end for end and again attached, the handle 22 being now accessible to permit the withdrawal of the liquid in any quantities as may be desired. The disk may bear any desired impression or imprint, such as a serial number, the name of the consignor, directions, trademarks, etc., which must be mutilated or destroyed before access to the container can be obtained, thereby protecting the consignor and consignee against fraud.

Except for opening 6, the container is closed and sealed at all points, that is, there are no other openings in its end and side walls. However, provision is made for producing a vent opening with facility and dispatch without the use of any instrument except a hammer or equivalent tool. Thus, head 3 is made of sheet metal, and a shallow round indentation 28 is made therein to the depth of about one-half of the thickness of the metal, the circular edge 30 of the depression being materially reduced at said edge by the dies which are used to produce the indentation. In other words, indentation 28 represents a small disk-like part which is partially but not wholly stamped out of head 3, but which may be easily punched or knocked inwardly to produce a round vent opening in the head. The major part of edge 30 may be indented sharply and a small segmental portion 29 not so abruptly and sharply so that when the disk-like part is punched inwardly the segmental portion 29 will not be severed but will serve to prevent the severed part from dropping into the container.

What I claim, is:

1. A shipping container, comprising a bung ring, a faucet having an enlarged head portion detachably secured within said ring, said faucet when inserted through said ring having a wrench-engaging portion exposed opposite and within the mouth of the ring, and a thin disk secured within the mouth of said ring opposite and close to said wrench-engaging portion, said disk being readily destructible to permit wrench engaging connections to be made but not removable from said ring without giving evidence of tampering and removal.

2. A shipping container, comprising a bung ring having a depressed seat for a sealing washer and an enlarged mouth portion formed with a narrow annular groove, a faucet having a body adapted to be inserted through said ring and provided with a head adapted to engage said bung ring seat, said ring and faucet being provided with means for detachably securing them together either with the faucet body extending into the container or in the opposite direction outside of the container, and a thin destructible metal disk adapted to be wedged within said grove in the mouth of said ring to seal and conceal the faucet when extending into the container.

3. A shipping container, comprising a bung ring having a depressed seat and a grooved mouth, a faucet having a body provided with an axial fluid passage, a coupling head for said body having an angular wrench socket extensive with said passage, said faucet head being adapted to be reversibly seated upon said bung ring seat, in combination with a thin metal concavo-convex disk adapted to be inserted within the mouth of said bung ring and flattened and wedged within said grooved mouth to close said socket and passage and to seal said faucet within the bung ring.

4. A shipping container, comprising a bung ring, a closure member within said bung ring including a faucet adapted to be reversibly connected to said ring, and a sealing member, inserted within the mouth of said bung ring opposite said closure member and irremovably secured to said ring unless mutilated or distorted.

5. A shipping container comprising a bung ring, a reversible closure member including a faucet adapted to be secured in sealing connection within said ring, and a sealing disk inserted into the mouth of said ring in front of said faucet and irremovable unless mutilated.

6. A shipping container, comprising a bung ring having a recessed seat for a closure member, a faucet adapted to be secured within said ring upon said recessed seat, and a second closure member forcibly inserted into the mouth of said ring in front of said faucet, said second member comprising a thin disk rigidly held in front of said first closure member and irremovable from said ring unless mutilated or destroyed.

7. A shipping container, comprising a recessed bung ring having a circumferentially channeled part in its recessed portion, a valve closure member seated within said ring upon the recessed portion thereof, and a thin flexible sealing disk providing a second sealing and closure member wedged within the channeled portion of said ring and irremovable therefrom unless mutilated or destroyed.

8. A shipping container, comprising a bung ring having a depressed seat for a sealing member, and an annular groove bordering the entrance to said ring, a screw-threaded member confined within said bung ring having a wrench socket within its outer face, and a thin destructible metal disk wedged within said groove closely adjacent said socket and adapted to be perforated by a wrench pressed against the same axially of said socket.

In testimony whereof I affix my signature.

CLARENCE H. RIEGEL.